US008665719B2

(12) United States Patent
Bitar et al.

(10) Patent No.: US 8,665,719 B2
(45) Date of Patent: Mar. 4, 2014

(54) VARIABLE PACKET-SIZE BACKPLANES FOR SWITCHING AND ROUTING SYSTEMS

(75) Inventors: Nabil N. Bitar, Winchester, MA (US); Philip To, Burlington, MA (US); Thomas A. Hoch, Boxborough, MA (US)

(73) Assignee: Alcatel Lucent, Paris (FR)

( * ) Notice: Subject to any disclaimer, the term of this patent is extended or adjusted under 35 U.S.C. 154(b) by 2411 days.

(21) Appl. No.: 10/838,780

(22) Filed: May 3, 2004

(65) Prior Publication Data
US 2005/0243852 A1 Nov. 3, 2005

(51) Int. Cl.
*H04J 3/14* (2006.01)
*H04L 12/26* (2006.01)
*H04L 12/28* (2006.01)
*H04L 12/56* (2011.01)

(52) U.S. Cl.
USPC ..... 370/231; 370/235; 370/395.4; 370/395.5; 370/413; 370/471; 370/474

(58) Field of Classification Search
USPC .......... 370/231, 235, 395.4, 395.5, 413, 471, 370/474
See application file for complete search history.

(56) References Cited

U.S. PATENT DOCUMENTS

| | | | | |
|---|---|---|---|---|
| 5,367,643 A * | 11/1994 | Chang et al. | | 710/62 |
| 5,959,994 A * | 9/1999 | Boggs et al. | | 370/399 |
| 6,052,368 A * | 4/2000 | Aybay | | 370/357 |
| 6,067,301 A * | 5/2000 | Aatresh | | 370/418 |
| 6,646,983 B1 * | 11/2003 | Roy et al. | | 370/218 |
| 7,031,343 B1 * | 4/2006 | Kuo et al. | | 370/473 |
| 7,072,298 B2 * | 7/2006 | Paul et al. | | 370/231 |
| 7,212,528 B2 * | 5/2007 | Kuhl et al | | 370/389 |
| 7,292,594 B2 * | 11/2007 | Meempat et al. | | 370/413 |
| 7,362,751 B2 * | 4/2008 | Khacherian et al. | | 370/389 |
| 2003/0142624 A1 * | 7/2003 | Chiussi et al. | | 370/235 |
| 2005/0135355 A1 * | 6/2005 | Muthukrishnan et al. | | 370/389 |

OTHER PUBLICATIONS

Efficient Fair Queuing Using Deficit Round-Robin, Shreedhar et al., IEEE/ACM Transactions on Networking, V. 4, No. 3, Jun. 1996.

* cited by examiner

*Primary Examiner* — Alpus H Hsu
(74) *Attorney, Agent, or Firm* — Capitol Patent & Trademark Law Firm, PLLC (57) ABSTRACT

The present invention provides switches and routers, preferably with fully-connected mesh fabrics, that transmit data through the switch fabric in variable-size data units. Variable-size data units allow switches and routers to provide throughputs close to hardware capabilities, eliminating the need for over-capacity hardware in the switch fabric and other components. Along with variably-size data units, preferred embodiments of this invention include scheduling methods that provide fair allocation of pre-determined bandwidths to different protocols, to different classes of service within protocols, and to different resources within the switch by use of certain weighted, fair scheduling methods. The switches and routers of this invention are particularly directed to multi-protocol, high-throughput communication applications, but may have wide applicability in systems generally where data packets are switched or routed.

23 Claims, 4 Drawing Sheets

VARIABLE PACKET-SIZE BACKPLANES FOR SWITCHING AND ROUTING SYSTEMS

This application incorporates by reference in their entireties and for all purposes the following patent applications, all of which are owned or subject to a right of assignment to the assignee of the present application and all of which were filed concurrently together with the present application: (1) the application titled "SYSTEMS AND METHODS IMPLEMENTING 1+1 AND N+1 LINE CARD REDUNDANCY", by Bitar et al.,(Ser. No. 10/838,781)(hereafter the "Redundancy application"); (2) the application titled "METHODS AND SYSTEMS FOR EFFICIENT MULTICAST ACROSS A MESH BACKPLANE" by Bitar et al., (Ser. No. 10/838,782)(hereafter the "Multicast application"); (3) the application titled " A UNIFIED SCHEDULING AND QUEUEING ARCHITECTURE FOR A MULTISERVICE SWITCH", by Bitar et al., (Ser. No. 10/838,788)(hereafter the "Scheduler application"); and (4) the application titled "SYSTEMS AND METHODS FOR SMOOTH AND EFFICIENT ROUND-ROBIN SCHEDULING", by Bitar et al., (Ser. No. 10/838,778)(hereafter the "SEWDRR application").

1. FIELD OF THE INVENTION

The present invention relates generally to switches and routers for communications networks, and more particularly to high-throughput and/or multi-service (multi-protocol) switches and routers, and provides improved backplane designs and backplane scheduling by use of variably-sized packets.

2. BACKGROUND OF THE INVENTION

An important class of data communication networks transmits data between users in fixed or variable sized data packets. These networks typically provide communication paths between user equipment. Internally, such networks have switching or routing nodes, or network elements (NE), that are themselves interconnected for actually transmitting packets from a source to a destination. Network data packets are typically structured with a header and a payload data area: a header carries network-specific information for routing, flow control, and so forth, and a payload area most often carries user data. Switches, routers, and similar internal nodes are typically constructed from: ingress (or input) elements, which receive data packets from communication links; egress (or output) elements, which transmit data packets over communication links; a switch fabric that interconnects the ingress and egress elements; and a control function. Typically a physical line card comprises both an ingress and an egress elements, however the two elements may be two separate devices. A switch or router uses data packet header information to determine to which egress element a received data packet should be directed.

A switch fabric has one or more transmission paths (threads) for transmitting data between ingress and egress elements, and a fabric control function for allocating on a moment-to-moment basis as needed transmission paths to particular pairs of ingress and egress elements. Many fabric topologies are known in the art, for example buses, crossbars, Banyan networks and other hierarchical interconnections, fully-connected meshes, and so forth. The fabric control function generally: receives requests for a path between a pair of an ingress and a egress element; allocates a path when available and notifies the requesting elements; and releases an allocated path when the ingress-egress pair have completed their data transmission. This control function may be centralized, for example, in central control element, or may be distributed, for example, relying on the cooperative actions of the ingress and egress elements.

The prior art has found advantageous that switch fabrics operate synchronously and transfer data in fixed-size packets, known as fabric data units (FDUs). Synchronous fabric operation leads to simplified interfaces between ingress and egress elements and the fabric. Fixed-size FDUs lead to a simplified fabric controller function, because all switch paths may be synchronously allocated for one fixed time period. And short, fixed-size FDUs are advantageous because they can improve quality of service (QOS) by limiting interference between communication packet flows and improving latency and jitter.

However, fixed-size, short FDUs are not advantageous in all applications, particularly in applications where the switch must carry data packets of variable size. Variable-sized data packets are often found in multi-service (or multi-protocol) applications, and even in single protocol applications where the protocol inherently provides for such packets. In such application, fixed size FDUs introduce overhead because usually some data packets must be segmented (not all packets being an integer multiple of the FDU payload size). As is known, packet segmentation leads to switch overhead, because the last FDU of a data packet may transport a small packet segment (compared to the FDU payload size). Indeed, if the last segment of a communication packet is only one byte, then virtually all the last FDU will be wasted overhead. Also short size alone introduces overhead, because a greater fraction of switch throughput is used by FDU headers, not payload data.

Changing the fixed FDU size may not alleviate such overhead. Although shorter FDUs reduce overhead due to unused FDU capacity, they increase the overhead of FDU headers. On the other hand, longer FDUs reduce FDU-header overhead, but at the cost of increased overhead due to packet segmentation. They may also lead to increased latency and jitter.

Accordingly, the prior art is deficient in routers and switches for multi-service or multi-protocol applications that nevertheless have reduced overhead and high efficiency.

3. SUMMARY OF THE INVENTION

The present invention overcomes these identified prior-art problems, providing methods for switch and/or router systems that forward communication data packets through the system switch fabric in variably-sized packets known as fabric data units (FDU). These methods allow switches and routers to perform efficiently in an environment having variable, and usually unpredictable, communication data packet sizes. Accordingly, the switches and routers of this invention can efficiently operate in multi-service or multi-protocol applications, and specifically, in applications where both internet protocol (IP) and asynchronous transfer mode (ATM) packet flows must be handled.

These methods also preferably include control functions for selecting queued communication data packets to forward through the systems that provide controlled and fair use of switch resources. These methods, known as schedulers, can limit the effect of packet-size distribution on system resource allocation. Preferred switch and/or router systems have one or more ingress elements for receiving communication data packets, one or more egress elements for transmitting communication data packets, and a fully-connected switch fabric. Implementation of the methods of this invention is preferably distributed among the ingress and egress elements so that a central control element is optional and not required.

In a first preferred embodiment, this invention includes a system for switching or routing communication data packets having: (a) a plurality of ingress elements linked to a plurality of egress elements by a switch fabric, wherein the ingress elements receive data packets and the egress elements transmit data packets, and wherein the switch fabric transmits data between ingress and egress elements in fabric data units (FDU) having sizes varying from a minimum size to a maximum size; and (b) one or more control elements for performing repeatedly the steps of selecting a data packet received by an ingress element; and forwarding the selected data packet to an egress element in one or more variably-sized FDUs.

The first embodiment further includes aspects: in which the control elements forward at least one data packet in two or more FDUs with all but the last FDU being of the maximum FDU size, the last FDU varying between the minimum and the maximum FDU sizes; and in which the size of the last FDU is less than the maximum FDU size; and in which the switch fabric has at least one unshared transmission path connecting each input element with each output element; and in which the control elements further perform a step of allocating a fabric path between the ingress element and the egress element prior to forwarding an FDU; and in which the control elements include a central control element for allocating fabric paths in response to requests from ingress elements and/or egress elements; and in which the control elements include a plurality of control elements residing on the ingress and/or egress cards for allocating fabric paths between ingress elements and egress elements; and in which the ingress and/or egress elements include schedulers residing on the ingress and/or egress cards for performing the step of selecting a data packet, the schedulers performing scheduling methods that provide service to data packets in a manner substantially independent of data packet sizes; and in which the schedulers perform a deficit type of scheduling method; and in which the schedulers perform a weighted-fair type of scheduling method; and in which the maximum FDU size is selected to control service latency or service latency variability for data packets.

In a second preferred embodiment, this invention includes a method of switching or routing communication data packets from an ingress element to an egress element through a switch fabric having the steps of: maintaining a plurality of data packet queues, wherein each queue holds received data packets with similar service characteristics and/or requirements; scheduling a next data packet on a next queue for forwarding to an egress element; and sending the scheduled data packet to the egress element through the switch fabric in one or more fabric data units (FDU), wherein the FDUs have sizes varying between a minimum size and a maximum size; wherein the steps of scheduling and sending grant to each queue an amount of service that is substantially independent of data packet sizes.

The first embodiment further includes aspects: in which at least one communication packet is an internet protocol (IP) packet and at least one communications packet is an asynchronous transfer mode (ATM) packet; and in which the steps of maintaining, scheduling, and sending are performed independently for each ingress and/or egress element; and in which service is measured in units of bytes sent; and in which the steps of scheduling and sending grant to each queue an amount of service that can be substantially pre-selected; and in which the step of scheduling performs a weighted-fair type of scheduling method; and in which the weighted-fair type of scheduling method is SEWDRR; and in which at least one data packet in forwarded two or more FDUs with all but the last FDU being of the maximum FDU size, the last FDU having a size less than the maximum FDU size; and in which an FDU includes: a header area having a fixed-size for switch control information; and a payload area having a variable size for carrying data packets or portions of data packets, wherein total FDU size equals the fixed header size plus the variable payload size; and further comprising a step of allocating a fabric path between the ingress element and the egress element prior to sending an FDU.

In a third embodiment, the invention includes a program product comprising a computer readable medium, such as a CD-ROM and also network file transfer, having encoded instructions for causing a computer to perform the methods of this invention.

4. BRIEF DESCRIPTION OF THE DRAWINGS

The present invention may be understood more fully by reference to the following detailed description of the preferred embodiments of the present invention, illustrative examples of specific embodiments of the invention, and the appended figures in which.

5. DETAILED DESCRIPTION OF THE PREFERRED EMBODIMENTS

Preferred embodiments of the methods and systems of this invention are described herein.

Figure 1:
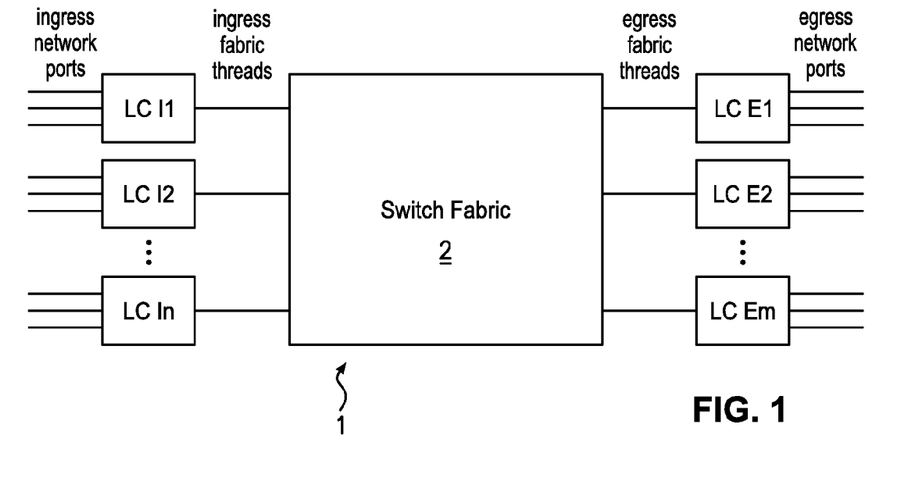
FIG. 1 illustrates an exemplary switch or router.

FIG. 1 generally illustrates a switch/router architecture suitable for the present invention. Switch/router 1 includes ingress elements, namely ingress line cards LC I1 to LC In, egress elements, namely egress line cards LC E1 to LC Em, and switch fabric 2 (also known herein as a "backplane"). Each ingress line card provides one or more input ports for connecting network communication links and one or more output ports connecting switch fabric links (threads). Each egress line cards provides one or more input ports for connecting switch fabric links and one or more output ports for connecting network communication links. Both types of line cards usually include processing and memory functions suitable for managing the flow of data packets from ingress elements to proper egress elements through the switch fabric. Data is transmitted from ingress to egress elements as fabric data units (FDU). FDUs generally are structured with a header, which may have information for routing (especially for self-routing switch fabrics), for FDU flow control, or for other switch control purposes, and a payload area, which usually has a data packet or a segment of a data packet.

The switch fabric provides paths (threads) that can be allocated by a centralized or distributed fabric control function to an ingress-egress card pair for transmitting a fabric data unit (FDU) usually carrying data packet payload. Many fabric topologies are known in the art, some having shared or partially shared threads such as one or more buses, Banyan and other hierarchical networks, partially connected meshes, and so forth, and some having unshared links such as fully connected meshes. In a partially connected mesh, certain pairs of ingress and egress cards (perhaps having higher throughput requirements) are fully mesh interconnected, while other pairs of cards (perhaps having lower throughput requirements) are connected using shared links. In some fully connected topologies, the threads may be serial lines with the ingress and egress cards implementing a SERDES interface technology.

Figure 2:
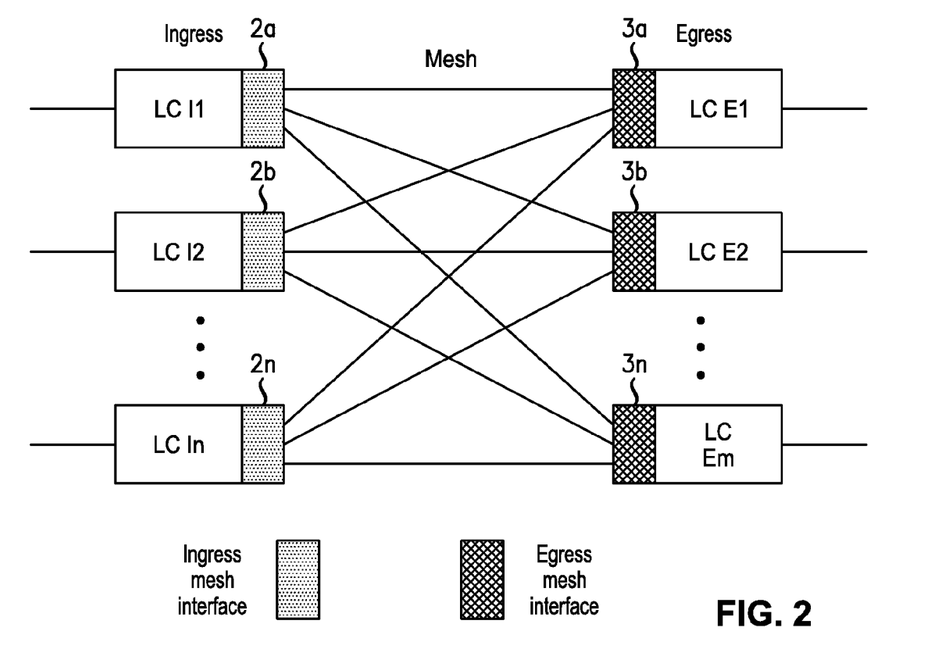
FIG. 2 illustrates an exemplary switch or router with a mesh backplane.

FIG. 2 illustrates a switch or router preferred for this invention with a fully-connected mesh backplane. Here, each ingress card has a separate thread to each egress card and no central arbitration elements are provided. Instead, control functions are distributed to the line cards, each ingress-egress card pair jointly handling its own transmission scheduling. For example, an ingress card with an FDU to transmit to a particular egress card will request that card's permission to transmit over their interconnecting thread. When its resources are ready, the egress card will grant permission, and the ingress card will then transmit its FDU. During a delay until permission is granted, both cards may be busy servicing other FDU transmissions, and after transmission is completed, the cards may continue with other activities. In further embodiments, an egress card may be able to exert "backpressure" on an ingress card, informing it to delay further requests for FDU transmission. A fully-connected mesh topology with a distributed control function enables high speed operation. In another method using a full-mesh fabric connecting ingress and egress cards and presented in the "Scheduler" application, there is no request-grant system. Each ingress can autonomously decide what and when to transmit to an egress card. Each card has a separate set of queues, known as Virtual Input Queues (VIQs) on the egress card. The egress card decides which VIQ to pick or schedule an FDU from. The egress card may exert backpressure to an ingress card when the corresponding VIQ reaches a threshold to throttle back the ingress card. The details of this system are revealed in the "Scheduler" application.

In FIG. 2, the ingress and egress card components (control elements, or, alternatively, schedulers) that request transmission permission and/or actually perform FDU transmission are illustrated by the interface blocks 2a, 2b,...2n and 3a, 3b,...3n in each type of card. Further, as will be discussed later, ingress cards maintain work queues of data packets received from its incoming communications links and waiting for transmission over the switch fabric to destination egress cards. The egress cards maintain queues of data packets received over the switch fabric and waiting for transmission on the proper outgoing communication link.

For high speed switches and routers, the prior art has found it advantageous that switch fabrics operate time-synchronously and transfer data in FDUs that are short and of fixed size. Synchronous operation simplifies the physical interfaces between the line cards and the fabric, fixed-size FDUs simplify control function by permitting synchronous allocation of all fabric transmission paths for one fixed time period, and short FDUs improve QoS by limiting latency and jitter.

Figure 3A:
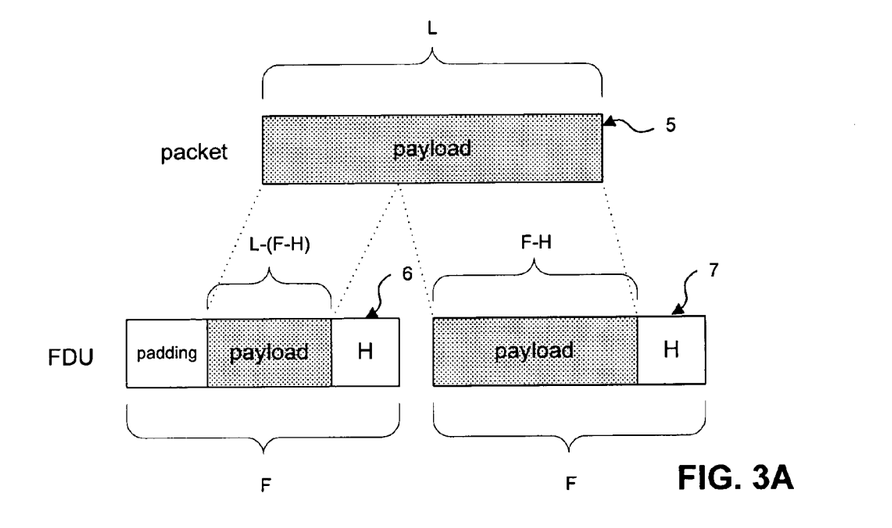
FIGS. 3A-B illustrate the use of fixed size FDUs.

FIGS. 3A and B illustrates the use of fixed size FDUs. FIG. 3A illustrates how data packets can be segmented into fixed-size FDUs and how this leads to wasted fabric transmission capacity. Here, communication packet 5 of length L (for example, in bytes) needs to transmitted across a switch fabric designed for FDUs, such as FDUs 6 and 7, of fixed size F (for example, in bytes). These FDUs have headers of length H (in other embodiments, FDUs may also have a trailer), and therefore a data payload size of F–H. In the illustrated example, because length L is greater than F–H but less than 2*(F–H), packet 5 requires two FDUs for transmission through the switch fabric: FDU 7 is fully loaded with F–H bytes from packet 5; and FDU 6 is partially loaded with the remaining L–(F–H) bytes. The unused payload area in FDU 6 of 2*(F–H)— L bytes is not usable for other data packets. It is overhead and its transmission wastes switch fabric transmission resources.

In general, to transmit a communication packet of length L through a switch requires that it be segmented into the payloads of ceil{L/(F–H)} separate FDUs (where ceil(x) is the least integer greater than x). Only when L is an integral multiple of F–H will there be no wasted capacity. Generally, this is not the case, and the last data packet segment will waste from 1 byte to F–H–1 B bytes of switch throughput.

Figure 3B:
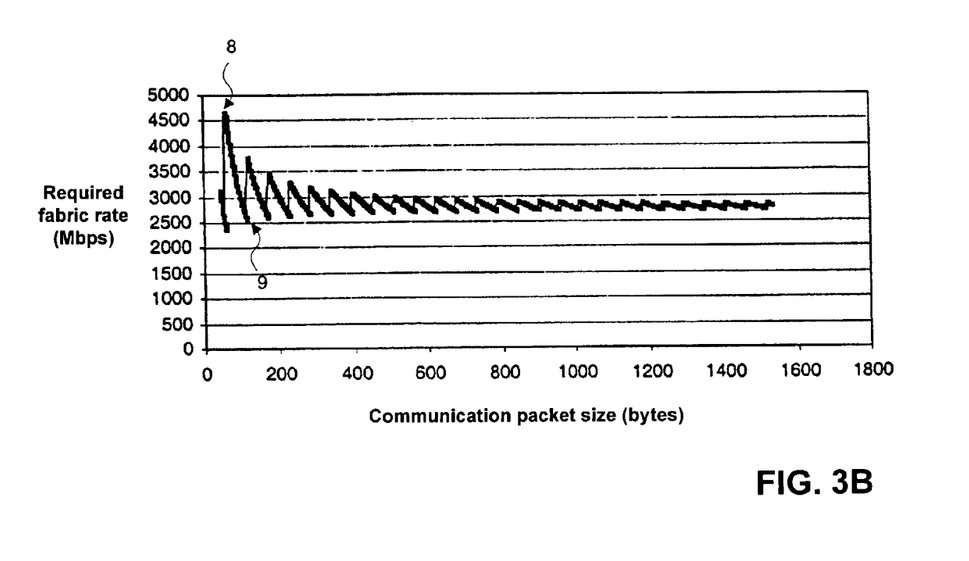

FIG. 3B illustrates the resulting of a sample switch fabric designed to transmit fixed 64 byte FDUs with 8 byte headers (and thus a data payload size of 56 bytes). The horizontal axis is communication packet size, and the vertical axis is the required hardware bandwidth in Mbps (mega-bits-per-sec) required to provide a useful end-to-end throughput of 2.4 Gbps (giga-bits-per-second) for data packets of the corresponding sizes. A data packet of size 9 (with length that is a multiple of 56 bytes) may be segmented to fully use the payload capacity of a number of FDUs; the only wasted hardware capacity is for transmitting the 8 Byte FDU headers. The graph illustrates that such data packets will therefore effectively utilize the provided hardware bandwidth. However, a data packet of size 8 (with length 1 bytes plus a multiple of 56 bytes) cannot be so efficiently segmented; its last FDU carries only 1 byte of payload, the other 55 bytes being unavailable for communication data. If such a packet has a length of 57 bytes, it can effectively utilize only about one-half of the provided hardware bandwidth as illustrated by the graph.

Clearly, fixed-size FDUs lead to a required fabric hardware throughput that varies greatly with communication packet size. For certain small packet sizes, the required hardware throughput may be nearly twice the useful data communication throughput. Conversely, for a fixed fabric hardware throughput, the useful switch throughput exhibits similar large variations. The excess hardware throughput is wasted on FDU headers and zero-payload padding. These problems are likely in communication applications characterized by packet sizes that range over an interval, say from 64 to 1024 bytes. No choice of FDU size can be optimal, and for a disadvantageous packet size distribution, as may occur from time-to-time, effective switch throughput may be only about half of its maximum hardware throughput.

Therefore, a first aspect of this invention overcomes performance problems of switches or routers operating in environments with variably-sized data packets. Specifically, according to this invention, switch fabrics or backplanes are designed to transmit variably-size FDUs. The FDUs of this invention preferably vary between a minimum size, which can be as small as the header plus one byte, and a maximum size, referred to here as $F_{MAX}$. The maximum size may preferably be determined in view of requirements on data packet latency and jitter. Since the larger the FDUs the longer is the ingress-egress element pair connecting transmission path occupied, larger FDUs may lead to increased interference with other packet, increasing their transit time through a switch (latency) and the variability of this transit time (jitter). Thus, the FDUs may be as large as permitted by QoS requirements on these performance parameters.

Although this invention may be used with any fabric topology and control method, a topology providing unshared paths between each pair of ingress and egress elements along with fully distributed control is preferred. In such an unshared topology, each ingress-egress element pair can allocate and use its associated fabric thread for as long as needed for each FDU without complicating the allocation and use decision of other ingress-egress pairs. Further, all element pairs may employ similar, fully-distributed algorithms and methods for transmission thread allocation and use control.

Figure 4A:
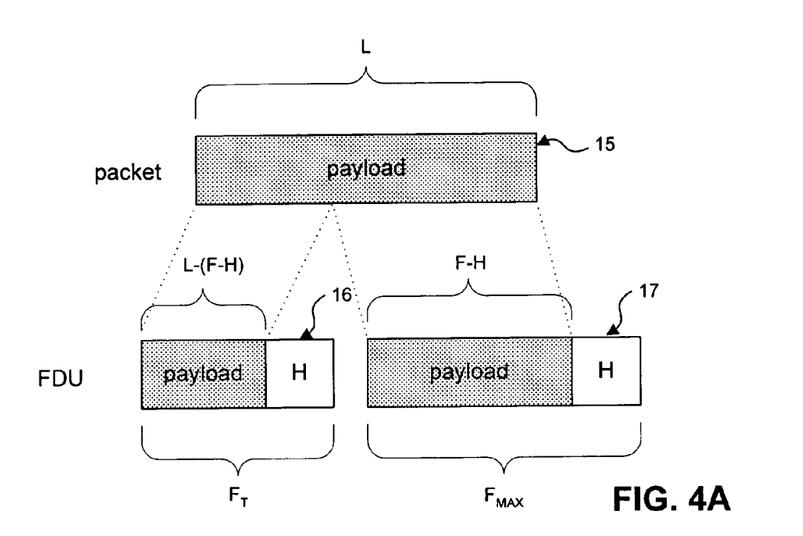
FIGS. 4A-C illustrate the variably-sized FDUs of this invention.
Figure 4B:
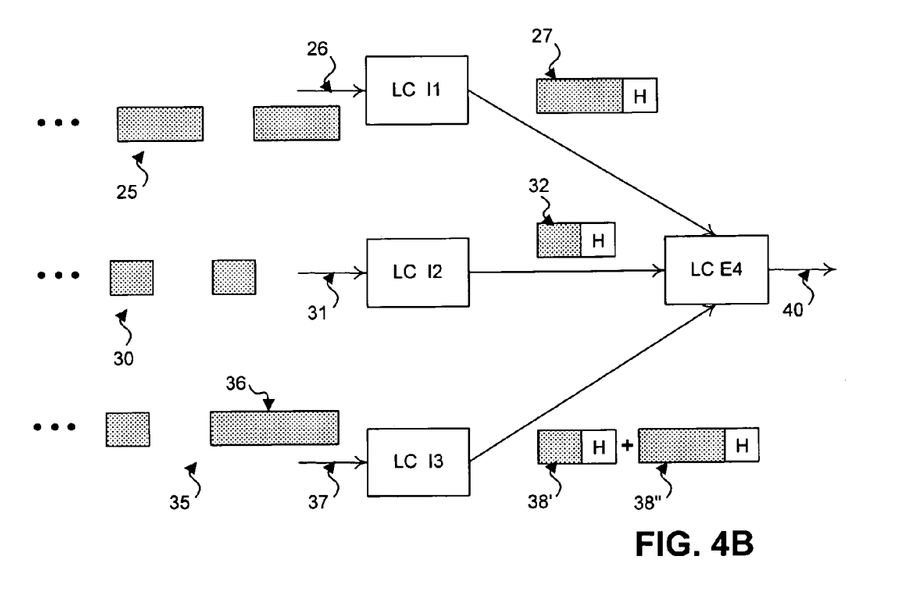

FIGS. 4A-B illustrate this first aspect. FIG. 4A illustrates communication packet segmentation into FDUs. Here, as in FIG. 3A, packet 15 has length L greater than $F_{MAX}$–H but less than $2*(F_{MAX}$–H), where $F_{MAX}$ is the maximum FDU size permitted by the switch fabric and H is the header size. Therefore, Packet 15 must be segmented into two FDUs, FDUs 16 and 17, for transfer through the switch. FDU 17 has a maximum sized payload of $F_{MAX}$–H bytes, while FDU 16 carries the remaining L–($F_{MAX}$–H) bytes. But in contrast to FIG. 3A, FDU 16 is truncated to a length, here L–$F_{MAX}$+2*H, just sufficient to carry the remaining L–($F_{MAX}$–H) bytes of packet 15. In the present invention, there is no unused capacity filled with zero-padding.

FIG. 4B illustrates how variably-sized FDUs are used in a multi-service or multi-protocol environment to improve the efficiency of switches and routers. Illustrated is an exemplary portion of a switch or router including three ingress elements, LC I1 to LC I3, a single egress element, LC E4, and switch fabric threads connecting each ingress element with the egress element. LC I1, in this example, receives input communication packets 25 over link 26 having a protocol providing for packets of a single intermediate size; LC I2 receives packets 30 over link 31 having a protocol providing for packets of a single smaller size; and LC I3 receives packets 35 over link 37 having a protocol providing for packets of variable sizes. At least some of packets 25, 30, and 35 are destined for multi-protocol link 40 connected to LC E4. Communication packet headers are not illustrated. The switch fabric of this example transmits variably-sized FDUs, for example FDUs 27, 32, 38', and 38" having headers H with payload sizes sufficient to accommodate intermediate sized packets 25.

Accordingly, LC I1 is able to place each intermediate sized packet 25 into a single FDU 27 for transmission to LC E4. LC I2 is able to place each smaller sized packet 30 into a single FDU 32 truncated so that the payload carries a single packet without any unused space. FDUs 32 are not padded with unused bytes. Turning to LC I3, packets 35 may range up to a size that exceeds the payload size of the largest FDU allowed by the switch fabric, and such packets will be segmented into multiple FDUs. For example, packet 36 is sized between one and two time the FDU payload capacity, and is segmented into two FDUs: FDU 38" is of maximum FDU size; FDU 38' is less than the maximum size. Importantly, FDU 38' is truncated so that it has no wasted space and carries no unused padding bytes. Thus, it will be appreciated that this invention efficiently utilizes available fabric bandwidth and does not require excess bandwidth to support a desired level of communication packet throughput. The only overhead is for FDU headers.

Figure 4C:
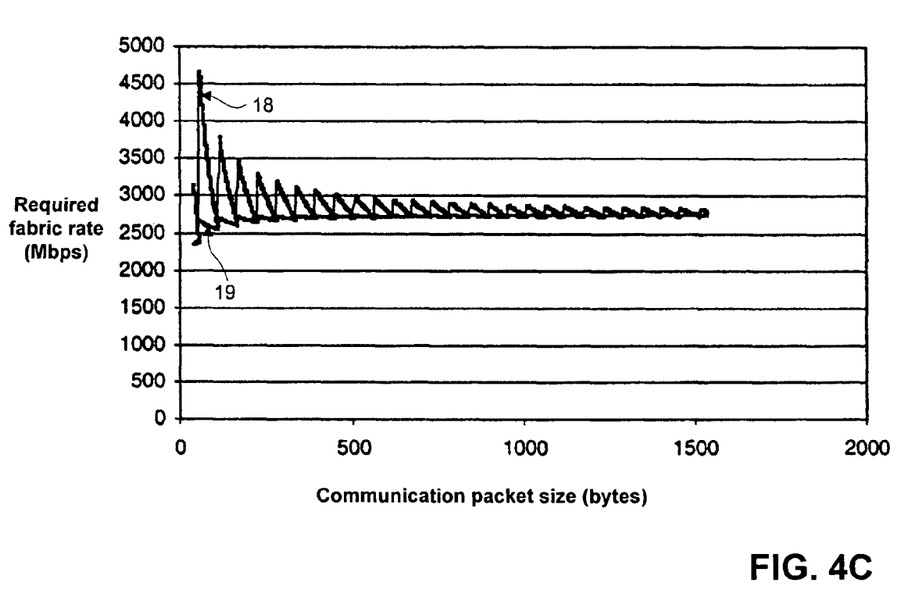

That the variably-sized FDUs of this invention significantly improve switch throughput may be further appreciated from FIG. 4C. In this figure, which has same axes as FIG. 3B, illustrates how. Graph 18, which reproduces the graph of FIG. 3B, illustrates the fabric hardware throughput required for a 2.4 Gbps data-packet throughput where the packets have various sizes but where the FDUs have a fixed-size 64 byte size with 8 byte headers are used. In contrast, graph 19 illustrates the required hardware throughput where, according to this invention, the FDUs are variably-sized from the header size of 8 bytes plus one byte of the payload, for the total FDU size of 9 bytes, to the payload size of 56 bytes, for the total FUD size of 64 bytes.

Comparison of these graphs clearly illustrates the improvement of the present invention. First, the required hardware bandwidth for a data packet throughput of 2.4 Gbps is approximately 2.74 Gbps regardless of communication packet size. FDU header overhead contributes to the extra 0.344 Gbps of required hardware throughput. In contrast, fixed-size FDUs required hardware throughput up to 4.7 Gbps for particularly disadvantageous packet sizes. Next, for an actual switch or router with a fabric of fixed hardware throughput, the present invention will provide a substantially uniform data packet throughput. The small throughput ripples in graph 19 are due to header overhead being amortized across a payload variable from 1 to 56 bytes. Again in contrast, fixed-size FDUs lead to data packet throughput variations of at least 10% through a substantial range of packet sizes, and for data packets smaller than about 250 bytes, to variations of 50% or even up to approximately 100

A further aspect of preferred embodiments of this invention is the method for scheduling the transport of communications data packets through a switch or router that uses variably-sized FDUs. Generally, ingress elements maintain queues for holding FDUs, obtained from received data packets, while waiting to be transmitted through the switch fabric to the proper egress element. Egress elements maintain queues for data FDUs waiting to be extracted and processed by the egress card. When there is no congestion (i.e., the traffic load to an egress card is less than the throughput of the egress card), the queues may be empty, an FDU being sent onward as soon as it is received from an the switch fabric. However, when there is congestion, FDUs will accumulate in these queues, and then the scheduling method (the manner of servicing these queues) can be important in increasing the effectiveness of this invention and providing fairness.

For example, a simple round-robin (RR) scheduling scheme that accounts for service in number of FDUs served, may lead to inadvertent unfairness. Ingress cards that receive packets which fill larger FDUs, up to a maximum FDU size, may obtain greater switch bandwidth than ingress cards that receive data packets which result in FDUs with smaller payloads.

This problem can be appreciated with reference again to FIG. 4B. FIG. 4 illustrates by a specific example how such unfairness and delay may arise. For concreteness, the variably-sized FDUs, such as FDUs 27, 32, 38' and 38", are assumed to have a header size of H bytes, a maximum payload size of P bytes, a minimum FDU size of H+1 bytes, and a maximum FDU size of H+P bytes; simple RR scheduling is used to allocate the fabric threads from LC-I1 and 2 to LC-E4 so that each line card sends one FDU in each scheduling round; and communications packets 25 and 30 all have sizes of P and P/2, respectively. Then, LC I1 is able to send twice as much data as LC I2, namely P bytes for every P/2 bytes sent by LC I2, and communication link 26 thereby receives twice as much service in the switch as communication link 31. Communication link 37 may use an even greater proportion of the switch's service. Further, because of the wide range of packet sizes received over communication link 37, packets received over links 26 and 31 may experience increased service variability, or jitter.

Thus, in its second aspect, this invention overcomes such problems employing scheduling methods which grant permission to transmit FDUs through the switch fabric, and which generally control the use of switch or router resources, which are able to track the actual service granted in fixed-size units that are significant to the intended QoS goals. In preferred embodiments, scheduler methods track service granted to queues in bytes or multiples of a small number of bytes (such as 5, 10, 32, or 64 bytes) so that QoS goals may be expressed in, for example, byte/sec (or bit/sec) throughputs.

Further, the preferred methods use the tracked service to grant service in a manner so that intended service (in bytes) is received. For example, if the actual service received by a queue falls below the intended service, the scheduler may grant service to that queue more frequently. Such a scheduler is referred to herein as a deficit scheduler, "deficit" because it grants service in view any differences between actual service and intended service. A deficit scheduler will prevent switch resources from being unfairly and/or inadvertently consumed. Such schedulers are known in the arts. See, e.g., Shreedhar et al., 1996, *IEEE/ACM Trans. on Networking* 4(3), pp. 375-385 (describing deficit round robin scheduling).

More preferred scheduler methods have additional features including: computational efficiency for use in high performance switches or routers; adapting to any service quantum recognized by the switch fabric; and sufficient service time-slicing so that jitter and latency can be limited or controlled. Finally, more preferred schedulers will be adaptable to various queues structures maintained in the ingress and egress elements. Such a more preferred scheduler is described in the copending SEWDRR application. The preferred scheduling method described in this application is referred to herein as the SEWDRR method. More preferred queue structures are described in copending Scheduler application. In such queue structures, ingress elements maintain received communication data packets in separate queues according to, for example, their protocol- or user-determined service characteristics and requirements. Egress elements maintains data packets in queues according to, for example, their service characteristics and requirements. Further, elements may maintain their various queues in a hierarchical arrangement.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of references are cited herein, the entire disclosures of which are incorporated herein, in their entirety, by reference for all purposes. Further, none of these references, regardless of how characterized above, is admitted as prior to the invention of the subject matter claimed herein.

We claim:

1. A system for switching or routing data packets comprising:
   (a) one or more ingress elements and one or more egress elements, wherein the ingress elements receive data packets from input ports, the egress elements transmit data packets to output ports and each of the ingress and egress elements includes a control element that allocates fabric paths,
   (b) a switch fabric for transmitting data packets from the ingress elements to the egress elements, wherein data packets are transmitted in variably-sized payloads of fabric data units (FDUs) having total sizes varying between a minimum size and a maximum size,
   wherein each control element further repeatedly performs each of the steps of (i) segmenting data packets received by an ingress element and encapsulating them into the payloads of two or more FDUs, if the packets' sizes exceed the maximum FDU payload size, and encapsulating data packets received by an ingress element into the payload of a single FDU, if the packets' sizes do not exceed the maximum FDU payload size, and (ii) transmitting FDUs from the ingress elements through the switch fabric to the egress elements.

2. The system of claim 1 wherein at least one data packet is an internet protocol (IP) packet and at least one other data packet is an asynchronous transfer mode (ATM) packet.

3. The system of claim 1 wherein at least one FDU with a size less than the maximum FDU size is transmitted through the switch fabric.

4. The system of claim 1 wherein data packets are segmented into one or more FDUs, the last FDU varying in size between the minimum and the maximum size with all but the last FDUs being of maximum size.

5. The system of claim 1 wherein the maximum FDU size is selected to limit service latency or to limit the variability of service latency.

6. The system of claim 1 wherein the switch fabric comprises at least one unshared transmission path connecting each ingress element with each egress element.

7. The system of claim 1 wherein each of the ingress and egress control elements further perform a step of allocating a path through the switch fabric between an ingress element and an egress element prior to forwarding an FDU from that ingress element to that egress element.

8. The system of claim 1 wherein each ingress control element selects a data packet for transmission through the switch fabric.

9. A method for switching or routing data packets from an ingress element to an egress element through a switch fabric wherein each of the ingress and egress elements includes a control element comprising:
   (a) receiving at least one data packet from at least one input port on at least one ingress element, and
   from each control element (i) allocating fabric paths, (ii) segmenting at least one received data packet and encapsulating it into the payloads of two or more fabric data units (FDUs), if the packet's size exceeds a maximum FDU payload size, wherein data is transmitted through the switch fabric in variably-sized fabric data units (FDUs) having total sizes varying between a minimum size and a maximum size, and encapsulating the data pack into the payload of a single FDU, if the packet's size does not exceed the maximum FDU payload size and (iii) transmitting at least one selected FDU from an ingress element through the switch fabric to an egress element.

10. The method of claim 9 wherein at least one data packet is an internet protocol (IP) packet and at least one other data packet is an asynchronous transfer mode (ATM) packet.

11. The method of claim 9 wherein at least one FDU with a size less than the maximum FDU size is transmitted through the switch fabric.

12. The method of claim 9 wherein data packets are segmented into one or more FDUs, the last FDU varying in size between the minimum and the maximum size with all but the last FDUs being of maximum size.

13. The method of claim 12 wherein at least one data packet is segmented into two or more FDUs wherein the size of the last FDU is less than the maximum FDU size.

14. The method of claim 9 further comprising a step of allocating a path through the switch fabric between an ingress element and an egress element prior to transmitting an FDU from that ingress element to that egress element.

15. The method of claim 9 wherein an FDU further comprises a fixed-size header area for control information, so that the total FDU size equals the fixed header size plus the variable payload size.

16. The method of claim 9 wherein the steps of receiving, segmenting, and transmitting are performed independently on at least one ingress element.

17. The method of claim 9 further comprising a step of selecting from a plurality of FDUs stored by the ingress element at least one FDU for transmission through the switch fabric.

18. The method of claim 17 wherein the step of selecting grants service to data packets that is substantially independent of data packet sizes.

19. The method of claim 18 wherein service is measured in units of bytes.

20. The method of claim 17 wherein the step of selecting grants service to data packets with similar service characteristics and/or requirements in a manner that can be substantially pre-selected.

21. The method of claim 17 wherein the step of selecting performs a deficit type of scheduling.

22. The method claim 17 wherein the step of selecting performs a weighted-fair type of scheduling.

23. The method of claim 22 wherein the weighted-fair type of scheduling method is round-robin.

\* \* \* \* \*